Sept. 23, 1969 P. M. ERLANDSON 3,468,453
WELDED CAN BODY AND METHOD OF FORMING THE SAME
Filed April 4, 1967 5 Sheets-Sheet 1

INVENTOR
PAUL M. ERLANDSON

BY
Mason, Porter, Diller & Brown
ATTORNEYS

INVENTOR
PAUL M. ERLANDSON

Sept. 23, 1969   P. M. ERLANDSON   3,468,453
WELDED CAN BODY AND METHOD OF FORMING THE SAME
Filed April 4, 1967   5 Sheets-Sheet 4

INVENTOR
PAUL M. ERLANDSON
BY
ATTORNEYS

Sept. 23, 1969    P. M. ERLANDSON    3,468,453
WELDED CAN BODY AND METHOD OF FORMING THE SAME
Filed April 4, 1967    5 Sheets-Sheet 5

INVENTOR
PAUL M. ERLANDSON

BY Mason, Porter, Diller & Brown
ATTORNEYS

United States Patent Office 3,468,453
Patented Sept. 23, 1969

3,468,453
WELDED CAN BODY AND METHOD OF FORMING THE SAME
Paul M. Erlandson, Palos Park, Ill., assignor to Continental Can Company, Inc., New York, N.Y., a corporation of New York
Filed Apr. 4, 1967, Ser. No. 628,388
Int. Cl. B65d 7/34, 7/38
U.S. Cl. 220—75          19 Claims

ABSTRACT OF THE DISCLOSURE

This disclosure has to do with a can body wherein the side seam thereof is welded. A specific feature of the side seam is that it terminates short of the ends of the can body whereby flanging of the welded seam can body may be accomplished without the cracking of the can body along the welded seam.

---

This invention relates in general to new and useful improvements in container constructions, and more particularly relates to a novel welded seam can body.

In the past, numerous attempts have been made to form the side seam of can bodies by welding operations. However, for various reasons, these efforts have not proved to be commercially acceptable. A primary reason for the failure in the past of welded seam can bodies is that the metal in or adjacent to the welded seam area is metallurgically different than the remaining metal of the can body and when the opposite ends of the can body are flanged for reception of can ends which are secured to the can body by a double seaming operation, the metal in the area of the welded seam will not properly form, but instead cracks. Then when the ends are secured to the can bodies with cracks along the welded seams by a double seaming operation, the cans are not gas tight.

In accordance with this invention, there has been provided a can body with a welded side seam wherein the fatally defective cracking along the welded side seam has been eleminated. This has been accomplished by terminating the weld of the side seam short of the ends of the can body, which may be accomplished by several methods which were either not heretobefore obvious or not heretobefore possible.

A preferred and most difficult method of terminating the weld of the side seam in controlled relation with respect to the ends of the can body is by controlling the electrical current flow to the welding electrodes. Of course, this is the most desirable method.

Another method of terminating the weld of a can body side seam in controlled spaced relation to the ends of the can body is to accurately position the tack welds along the side seam adjacent, but spaced from, the end of the can body, and when welding the side seam, terminating the flow of electrical energy to the welding electrodes while they are aligned with the tack welds so that the welded seam terminates in a tack weld at each end thereof.

A third method by which the welded seam may be terminated short of the ends of a can body does not involve the controlling of the flow of electrical energy to welding electrodes, but the termination of the welded seam is accomplished by a specific notching of the can body at the ends of the side seam.

A further feature of this invention is to provide a welded side seam in can bodies which are formed from individual blanks and wherein the thickness of the metal is considerably less than that which is customarily being utilized in the manufacture of can bodies.

A still further feature of this invention is to form a can body with a welded seam wherein the rolling grain of the metal from which the can body is formed extends circumferentially about the can so as to restrict undesired panelling and/or flange cracking of the can body.

With the above and other objects in view that will hereinafter appear, the nature of the invention will be more fully understood by reference to the following detailed description, the appended claims and the several views illustrated in the accompanying drawings:

The forming of can bodies with welded side seams on a commercially acceptable basis has long been the desire of can manufacturers. However, prior attempts have failed because there are two compulsory requirements which must be met for a welded seam can body to be acceptable. In the first place, the seam must not only have the desired strength, but must also be free of any openings therein. After these requirements have been met by the weld of the side seam, it is necessary that the welded seam can body be flangeable in a commercial manner so as to be receptive of a conventional end which is double seamed on the opposite ends thereof.

Flangeability is usually prohibitively poor when the following conditions are allowed to exist:

As a result of the 1.5 to 1.8 $t$ thickness in the lap, where $t$ is the nominal thickness of the metal, no effective elongation occurs there in response to the tensile flanging stress; thus elongation in the seam area must occur at points adjoining the lap along the edge being flanged.

As a function of the material, temperature reached in welding and the cooling rates attained, the metal adjacent to the lap may be anneal softened for a distance as little as .005″ from the lap edge with the original hardness of the metal existing beyond; where welding all the way to the end this softer material may be stretched beyond the elongation capability, neck, tear and result in defects commonly called flange cracks.

Figure 1:
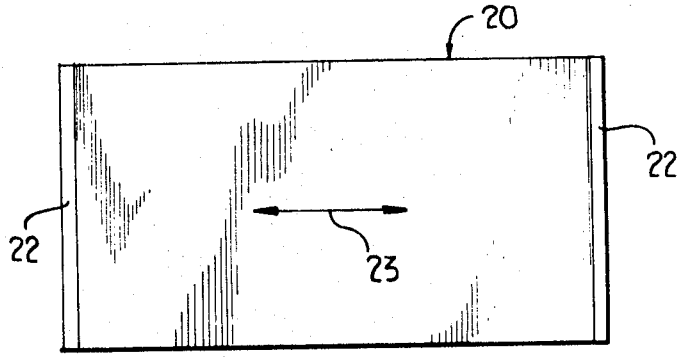
FIGURE 1 is a plan view of a blank from which a welded seam can body is formed in accordance with this invention.

In accordance with this invention, a rectangular body blank 20 which is shown in FIGURE 1 is provided. The body blank 20 is provided on the opposite surfaces thereof with a protective coating 21. Normally this coating will be a passivating coating, such as chromate phosphate, as opposed to the normal tin coating generally used in conjunction with can bodies. However, the coating material is not restricted to a passivating coating and could be tin or other corrosion resistant metals. The side edges of the body blank 20, normally have the coating 21 omitted therefrom or modified constituting a margin as at 22. The width of the margin must be at least equal to the overlap of the side edges in the final can body and normally will be of a width in excess thereof to assure the availability of clean surfaces, both for contact with one another and with the welding electrodes to be described hereinafter.

At this time, it is pointed out that the direction of rolling of the metal sheet from which the body blank 20 is formed is such that the grain of the metal of the body blank 20 runs in the direction of the arrow 23, that is parallel to the end edges of the body blank 20.

Figure 2:
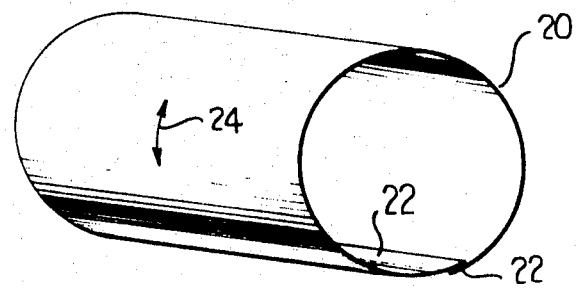
FIGURE 2 is a perspective view of the blank of FIGURE 1 rolled in cylindrical form ready for the welding of the side seam.

Reference is now made to FIGURE 2 wherein the body blank 20 is illustrated as being shaped into a tubular form with the edge portions 22 in lapped relation. It is to be noted that the grain of the metal of the body blank 20 now extends circumferentially, as is indicated by the arrow 24. The body blank 20 may be rolled to its cylindrical shape of FIGURE 2 in any conventional manner although it is preferred that this be accomplished by means of equipment normally found in body makers.

Figure 3:
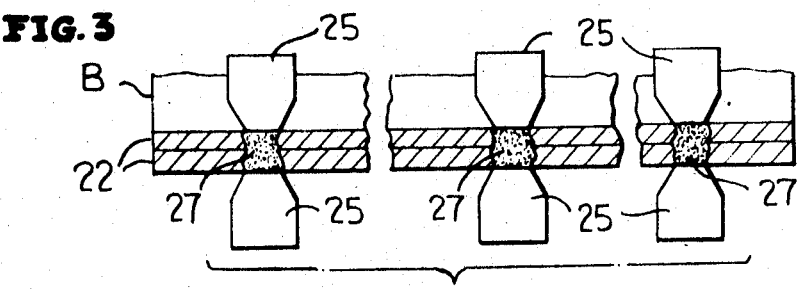
FIGURE 3 is an enlarged fragmentary longitudinal sectional view taken through the side seam area of the shaped blank of FIGURE 2 and shows the tack welding of the side seam.

After the body blank 20 has been rolled to its tubular configuration of FIGURE 2, the lapped edges 22 are tack welded together by a plurality of tack welding electrodes 25 which are arranged in pairs, as is best shown in FIGURE 3. It is to be noted that there is a pair of tack welding electrodes 25 adjacent, but spaced from, each end of the side seam. The welding electrodes 25, when energized, will tack weld together the lapped edge portions 22 of the body blank 20 so that the shape of a newly formed can body B is now established.

Figure 11:
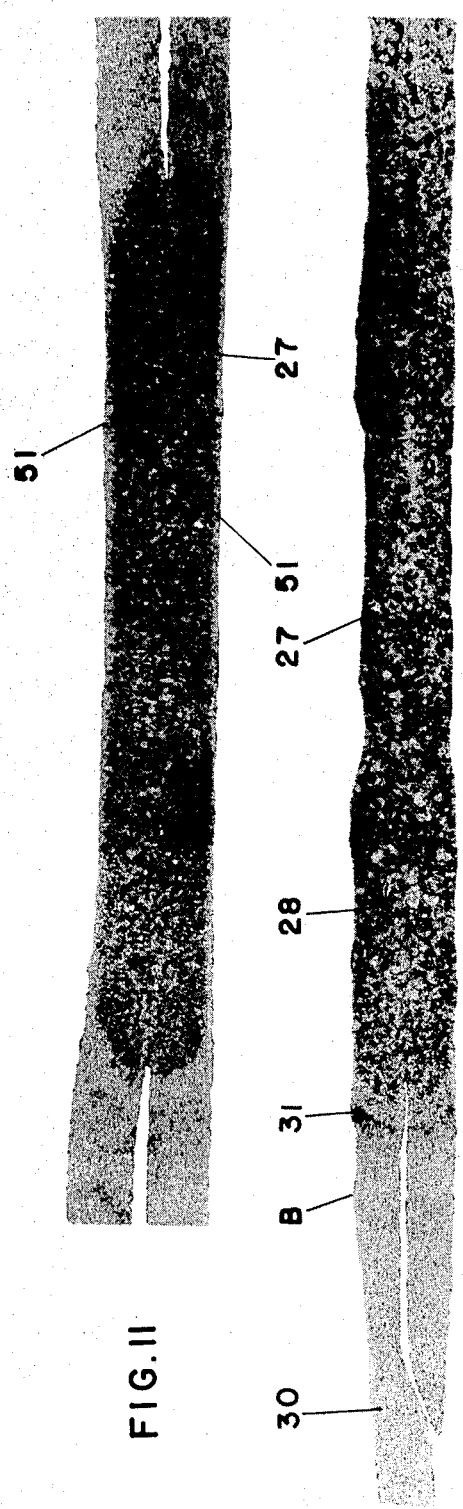
FIGURE 11 is a photomicrograph of a longitudinal section along the body seam through a tack weld.

Referring now to FIGURE 11, it will be seen that there is shown the specific grain structure of one of the tack welds, which is identified by the numeral 27. The low carbon steel shown in this figure is 0.006 inch thick in a cold rolled state, evidenced by a flattened grain structure away from the weld. Heating due to the formation of the tack weld 27 is very localized; hottest at the original weld interface, although below the melting point of the steel, and relatively cool at the electrode contacting surfaces 51 as evidenced by the still flattened crystals there. The presence of the still flattened crystals at the surfaces 51 indicates that the surface temperature probably did not reach 1200 degrees F. although the center of the weld undoubtedly reached 1800–2000 degrees F., and was then cooled quickly by adjacent cold steel. Evidence of this high temperature at the center of the weld and the quick cooling is the martensitic level of hardness in the weld which is 400–450 DPH (Diamond Penetration Hardness) as compared to 190–200 DPH in the original cold rolled low carbon steel.

Figure 4:
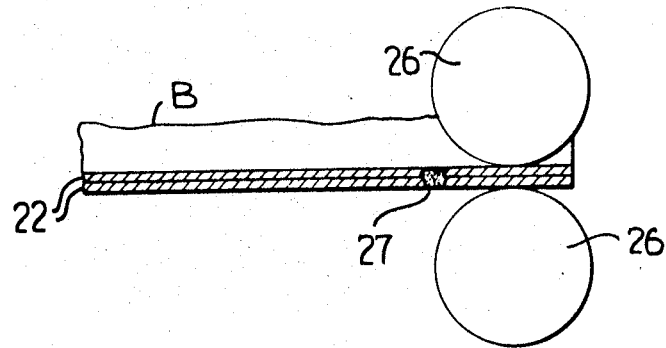
FIGURE 4 is a fragmentary longitudinal sectional view through the can body after the initial tacking of the side seam and shows the manner in which the side seam is welded by means of roller electrodes.

Referring now to FIGURE 4, it will be seen that the tack welded can body B has the seam area thereof passed between a pair of roller electrodes 26 which cooperate to continuously weld together the lapped edge portions 22 to form a welded body seam.

Figure 17:
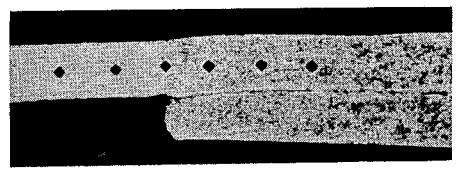
FIGURE 17 is a photomicrograph of a half transverse section through a welded body seam with the hardness of the metal at regular spacings therealong being indicated.
Figure 18:
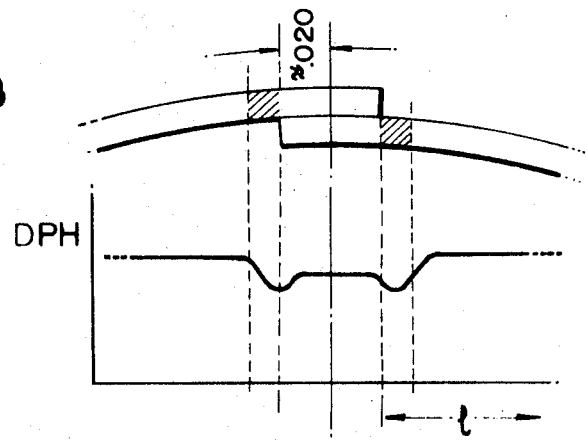
FIGURE 18 is a schematic showing of hardness through a welded body seam.

Reference is now made to FIGURE 17, which is an enlargement, and FIGURE 18 wherein there is clearly shown the hardness of a can body at regularly spaced intervals taken transversely across a leading end of a welded can body seam wherein the can body is formed of double reduced low carbon black plate. This black plate, in the rolling thereof, is cold worked to provide a 35% thickness reduction. As a result, the metal of the can body has a hardness ranging from 210–220 DPN. When the lapped edges of the body blank are welded together in accordance with the welding method shown in FIGURE 4, the lapped edges are uniformly heated to a temperature generally in the range of 1800 degrees F. to 2000 degrees F. Furthermore, the metal of the can body is progressively heated to this temperature along the full length of the seam. The volume of the metal heated to this temperature is relatively great, and as a result, there is a relatively slow cooling of the heated metal as compared to a welded seam formed by a plurality of spot welds. This results in an annealing of the work hardened metal in the seam area notwithstanding the fact that coarse austenitic grains are formed during the welding. As a result, the hardness of the can body metal through the welded seam is slightly less than that of the original metal of the can body.

The relative softness of the metal in the seam area as compared to that of the remainder of the can body is not detrimental. However, as is shown on the photomicrograph of FIGURE 17 and is clearly illustrated in the diagrammatic showing of FIGURE 18, the hardness of the metal of the can body is at a minimum immediately adjacent each side edge of the welded seam. This is detrimental in that in order to secure ends to a can body, it is necessary that a flanging operation be performed on the opposite ends of the can body. Such a flanging operation requires about a 7.5% elongation of the extreme end of the can body. Considering the average $2^{11}/_{16}$ inch diameter beer can which has a circumference of roughly 8 inches, approximately 0.6 inch of stretch or elongation must be found. Although the metal in the welded seam is slightly softer than the metal of the remainder of the can body, due to the increase in thickness of the metal in the seam, there is lesser stretch or elongation in this section of the can body. On the other hand, immediately adjacent the welded seam the metal of the can body is not nearly as thick as that in the welded seam and at the same time this metal is softer than either the metal of the welded seam or the remainder of the can body. As a result, in the flanging of the end of the can body, the portions of the can body immediately circumferentially adjacent the welded seam unduly elongate and cracking of the annealed metal adjacent to the welded seam will occur in an excessive percentage of can bodies.

In view of the fact that flange cracking occurs in a percentage of can bodies above that acceptable for commerical production, a modification of the seam welding technique became necessary. As a result, in accordance with this invention, the welded body seam is terminated a controlled distance short of the ends of the can body. Inasmuch as the stretching or elongation of the metal of the can body during a flanging operation is a maximum at the extreme end of the can body and becomes aggressively less as the flange approaches the unchanged portion of the can body, the termination of the welded seam may be in the flanged area, but short of the point when the stressing of the metal will be to the extent that cracking will occur. It will be understood that the welded seam will terminate sufficiently within the flange to permit the formation of a sealed seam.

Figure 5:
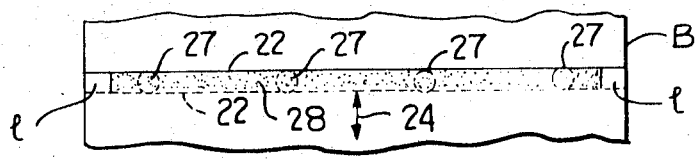
FIGURES 5, 6, 7, 8 and 9 are fragmentary schematic plan views of the side seam areas of can bodies formed in accordance with this invention.

Referring now to FIGURE 5 in particular, it will be seen that the welded body seam in this form of can body B completely absorbs the tack welds 27 formed by the tack welding electrodes. Also, it is to be noted that the seam weld 28 terminates short of the ends of the can body B by a dimension *l*. It is to be understood that the dimension *l* will vary depending upon the diameter of the can body B and the specific type of double seam utilized in securing an end to the can body B. However, for the smaller diameter cans ranging in diameter for 2 inches to 3 inches, the dimension *l* should not exceed 0.100 inch and should be at a minimum 0.010 inch. It is to be understood that this dimension may be controllably modified by varying the usual cement material and placement of the cement within the seam as well as the can end configuration. From a commercially acceptable standpoint, the dimension *l* should range from 0.020 inch to 0.040 inch with the optimum dimension ranging from 0.025 inch to 0.035 inch.

In the formation of the seam weld 28, the timing of the flow of electrical energy to the roller electrodes 26 is critical. Even at a modearte welding rate, the can body B is moved between the roller electrodes 26 at a rate of 20 inches per second. Thus, in one thousandth of a second, the can body will have moved 0.020 inch.

Figure 12:
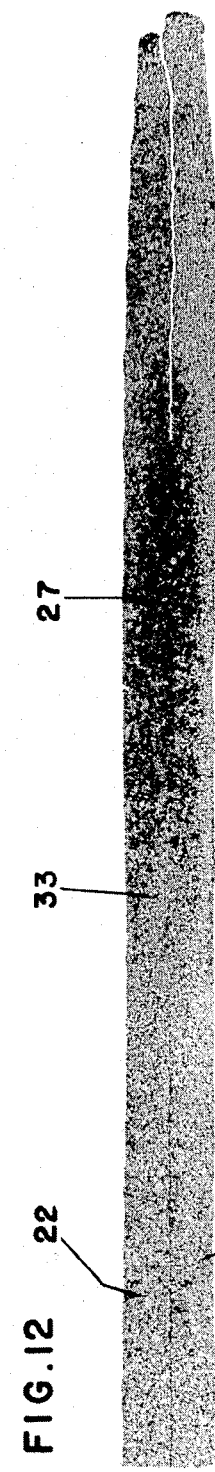
FIGURE 12 is a longitudinal sectional view taken through one end of a can body side seam formed in accordance with FIGURE 5.

Referring now to FIGURE 12 in particular, it will be seen that as the seam portion of the can body B passes between the roller electrodes 26, there is an initial cold rolling of the end portion of the seam as at 30. Then when controlled flow of electrical energy to the roller electrodes 26 occurs, the seam weld 28 begins at 31, the end portion 30 of the weld area remaining unwelded. The seam weld 28 extends over the tack welds 27 and is continuous until it termiantes adjacent the opposite end of the seam area of the can body.

It is to be understood that specific control means are required to both initiate the flow of electrical energy to the electrodes 26 and through the can body, and to terminate the flow of such electrical energy in extremely accurate timed relation to the movement of the can body B between the electrodes 26.

Figure 15:
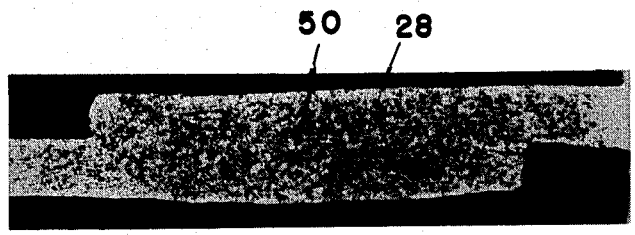
FIGURE 15 is a photomicrograph of a transverse section through a welded body seam and corresponds generally to the schematic showing of FIGURE 10.

Referring once again to FIGURE 12, the photomicrographic of this figure, like those of FIGURES 11 and 15, is a 78× enlargement. The pressure of the seam welding electrodes 26 has thinned the steel of the body blank and pushed one edge portion 22 of the lapped body blank into the other. It will be apparent that after the electrodes 26 cold roll the steel of the body blank along the side seam area for a distance of about 0.040 inch, electrical energy was supplied to the roller electrodes 26 to initiate welding. It is to be noted that once welding occurred, the original interface between the lapped edge portion became completely obliterated. The welded seam shown in this photomicrograph was quite hot, in the general temperature range of 2300–2500 degrees F., although generally below the melting point of the particular low carbon steel. This "hotness" is evidenced by the rather coarse grain structure. The high temperature at the weld interface persists to the surfaces along the welded seam in that there are no residual "flattened" cold rolled grains visible there. Further evidence of a hot weld is the presence of a few voids along the interface, created by local gas evolution associated with a high temperature. Still further evidence is offered by what is commonly called a "Widmannstatten" structure of parallel platelets in the coarse weld zone grains. Coarse austenitic grains formed during welding in 2300–2500 degrees F. and then, upon quite rapid cooling as the can body moves past the electrodes, the low temperature ferrite crystals formed as platelets on certain crystallographic planes of the high temperature austenitic crystals forming the "Widmannstatten" structure.

It will also be apparent from the photomicrograph of FIGURE 12 that electrical energy was pulsed to the roller electrodes 26 due to the existence of repetitive surface ridges spaced about 0.045 inch apart. At this time it is pointed out that the rather hot weld of this photomicrograph was selected so as to clearly show the effect of the pulsed electrical energy to the roller electrodes inasmuch as the softer state of the hotter steel permits clearer delineation of the repetitive pulsing. It is to be understood that the application of the electrical energy to the can body blank in the welding of the body seam is not to be restricted to pulsed electrical energy. It is to be understood that the electrical energy input may advantageously be DC and other types of energy input as opposed to the pulsed electrical energy.

Figure 6:
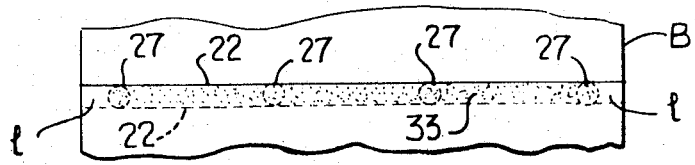

Reference is now made to FIGURE 6 wherein there is illustrated the can body B having a modified form of seam weld 33. The seam weld 33 corresponds to the seam weld 28 of FIGURE 5, but terminates in the tack welds 27 adjacent the ends of the can body B. In this form of can body, the endmost tack welds 27 are accurately positioned with each of the tack welds 27 being spaced from the adjacent end of the can body B by a distance *l*. The dimensions of the distance *l* will be the same as those set forth above with respect to the seam weld 28.

It will be apparent that the seam weld 33 is easier to form in that the timing of the electrical energy flow to the electrodes 26 is not as critical. However, the seam weld 33 has a deficiency in that the metal of the tack welds 27, when initially formed is normally harder and more brittle than the metal of the seam weld.

Figure 13:
FIGURE 13 is a photomicrograph of a longitudinal section through one end of a can body side seam formed in accordance with FIGURE 6.

Reference is now made to FIGURE 13 which is through a welded seam corresponding to that illustrated in FIGURE 6 of the drawing. Once again the photomicrograph is a 78× enlargement. It is to be noted that the seam weld 33 terminates at one end in the prior formed tack weld 27 which is clearly differentiated structurally. However, heat was generated within the tack weld, recrystallizing the surface grains as compared to the tack weld of the photomicrograph of FIGURE 11. This reheating of the tack weld 27 anneal softens the tack weld structure. The typical 400–450 DPH after tacking is reduced to about 300 DPH after seam welding.

Figure 14:
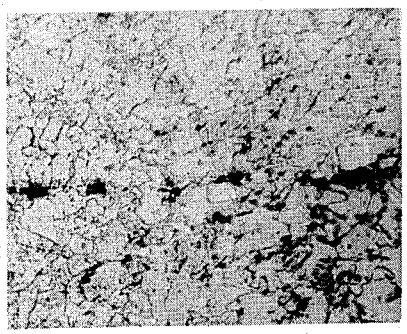
FIGURE 14 is a photomicrograph on a very enlarged scale of a longitudinal section of the welded body seam along the weld interface.

In contrast to the photomicrograph of FIGURE 12 the photomicrograph of FIGURE 13 was purposely chosen to illustrate a relatively cool forge weld. While the lapped edge portions 22 are definitely welded together, the original interface is still visible at this relatively low magnification. This is better seen in the photomicrograph of FIGURE 14 which is a 780× enlargement. This high magnification shows that despite the weld interface line being visible in FIGURE 13, true metallurgical bonding exists, as evidenced by ferrite crystals extending across the original interface. There are spots along the weld interface which make the interface readily identifiable in the micro structure.

Figure 7:
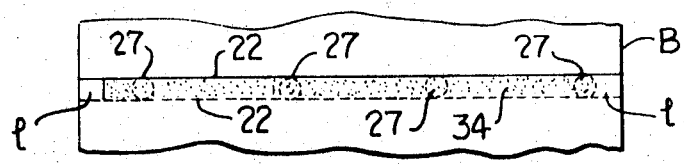

Referring now to FIGURE 7, it will be seen that there is illustrated another form of can body B which is a composite of the disclosures of FIGURES 5 and 6. The can body B has a seam weld 34 which at one end terminates in one of the tack welds 27 and at the opposite end projects beyond an associated tack weld. The ends of the seam weld 34 terminate short of the ends of the can body B by a distance *l* which will fall within the general range set forth above with respect to FIGURE 5.

The arrangement of the seam weld 34 has a particular advantage in that it is more difficult to accurately terminate the flow of electrical energy to the roller electrodes 26 than it is to initiate the flow of electrical energy to the electrodes. Accordingly, the seam weld 34 may have its starting end in advance of the associate tack weld 27 and its terminal end in the tack weld 27 disposed adjacent the opposite end of the can body. Such an arrangement would have many of the advantages of the preferred embodiment of FIGURE 5 and still overcome the difficulties encountered in accurately terminating the welding operation.

Figure 8:
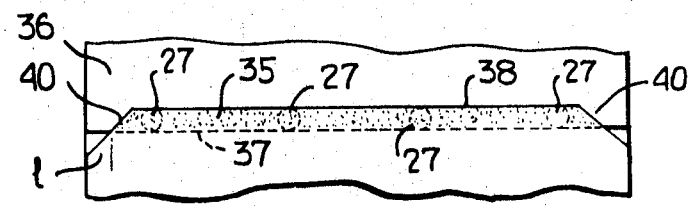

In FIGURE 8 there is illustrated the can body B with another form of seam weld which is identified by the numeral 35. Like the can bodies of FIGURES 5 and 6, the can body of this figure has the lapped edges of the body blank initially secured together by a plurality of tack welds 27. The seam weld extends over the tack welds 27 and terminates short of the ends of the can body by a distance *l*. However, the termination of the seam weld 35 short of the ends of the can body B is accomplished without a critical timing of the flow of electrical energy to the electrodes 26. It is to be noted that the can body of FIGURE 7 is formed from a body blank which is slightly modified from the body blank 20 of FIGURE 1. The body blank is identified by the numeral 36 and has one side edge 37 which is straight cut and the opposite side edge 38 which is provided at the opposite ends thereof with notches 40. The extent of the notches 40 is such that the overlap of the side edges 37 and 38 terminates at substantially the distance *l* from the ends of the can body B. Thus, while the electrodes 26 are preferably energized after the body blank 36 is presented thereto and flow of electrical energy thereto is discontinued prior to the passage of the body blank between the electrodes, it will be seen that the timing of the energization of the electrodes 26 is not as critical in that the energization and de-energization of the electrodes 26 may take place within distance *l*. Furthermore, it is not overly critical if the energization of the electrodes 26 occurs either shortly in advance of the presentation of the body blank 36 thereto or after the passage of the body blank therebetween although it is preferred that this not occur to avoid any possible arcing between the body blank and the roller electrodes.

Figure 9:
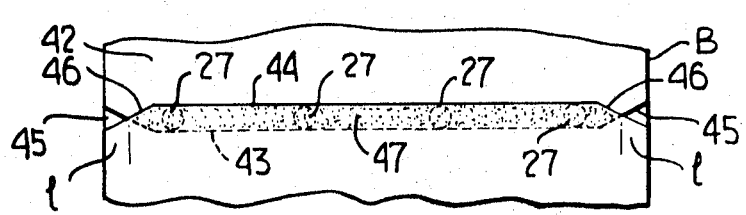

In FIGURE 9 there is illustrated still another form of the can body B. The can body B is formed from a body blank 42 having side edges 43 and 44 which are both notched adjacent the ends thereof. The notches of the side edge portion 43 are identified by the numeral 45 while the notches of the side edge portion 44 are identified by the numeral 46. It is to be noted that the notches 45 and 46 at each end of the can body B cross one another at a distance *l* from the ends of the can body. The dimensions of the distance *l* are again those which have been set forth with respect to the can body of FIGURE 5.

The overlapped edge portions 43 and 44 of the body blank 42 are initially secured together by tack welds 27 which include end tack welds disposed closely adjacent to the points of overlap of the notches 45 and 46. The tack welds 27 are incorporated in a seam weld 47 which extends the full length of the overlap. It is to be understood that the notches 45 and 46 are not restricted to straight line notches, but may have other configurations such as curved lines which may be single, compound or reverse.

Figure 10:
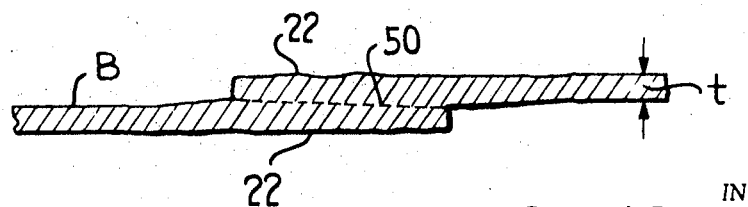
FIGURE 10 is an enlarged fragmentary transverse sectional view taken through a welded side seam and shows the specific details thereof.

Reference is now made to the schematic showing of FIGURE 10 and the photomicrograph of FIGURE 15, which photomicrograph is a 78× enlargement. It is to be seen that the sheet metal from which the can body B is formed has a thickness *t*. Inasmuch as the seam weld formed by the roller electrodes 26 is a forge weld, during the welding operation, the overlapped edge portions 22 become soft and are pressed together. This pressing together of the heat softened edge portions 22 results in the reduction of the thickness of the welded seam from a 2*t* dimension to a dimension ranging from 1.5*t* to 1.8*t*. This results also in a slight shifting of the weld interface which is identified by the numeral 50.

The reduction in thickness of the welded seam 28 necessitates the flowing out of metal. This metal is preferred to flow circumferentially into the adjacent heat affected areas so that the can body on opposite sides of the seam 28 for a distance of approximately 5*t* is of a thickness slightly greater than 1*t*. As a result, the can body is reinforced immediately adjacent the welded seam 28 which tends to counteract any of the above discussed weakening of the can body immediately adjacent the welded seam.

Figure 16:
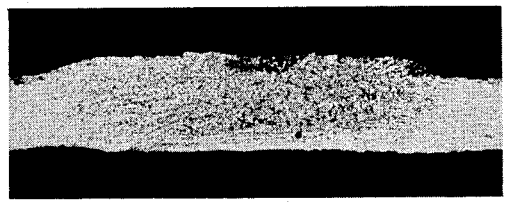
FIGURE 16 is a photomicrograph of a transverse section through a welded body seam having a narrow lap.

It is also pointed out at this time that the width of the welded seam has a controlling factor. At the present time, with 0.006 inch sheet, laps greater than 0.040 inch have not been used extensively. While this is a commercially acceptable lap width and the width of the lap could be increased within limits, it is normally not desired in view of the extra power required and the cost of extra material as the lap width increases. Attention is directed at this time to the photomicrograph of FIGURE 16, which is an enlargement on the order of 78×, wherein the lap is on the order of 0.015 inch. It is to be noted that where the lap is reduced to a minimum, the resistance of the heated metal to flowing under pressure is greatly reduced, and as a result, the thickness of the seam is reduced to a thickness on the order of 1*t* to 1.4*t*. At the same time, the weld interface is shifted to a diagonal position and the resultant weld has the combined advantages of both lap and butt welds.

While the test samples from which the photomicrographs of FIGURES 12 and 13 were taken show extremes in welding temperatures from 1400 degrees F. to 2500 degrees F., a preferred temperature range is from 1800 degrees F. to 2000 degrees F. With respect to this, reference is made to the diagram of FIGURE 19. It is to be noted that initial bonding will occur under the pressures found commercially feasible at this time at a temperature of 1200 degrees F. or slightly above. However, this bonding is not commercially acceptable and therefore, as indicated above, the lower operating temperature limit should be on the order of 1400 degrees F. However, as indicated from the diagram, at the present operating pressures, the complete bonding temperature is on the order of 1500 degrees F.

Figure 19:
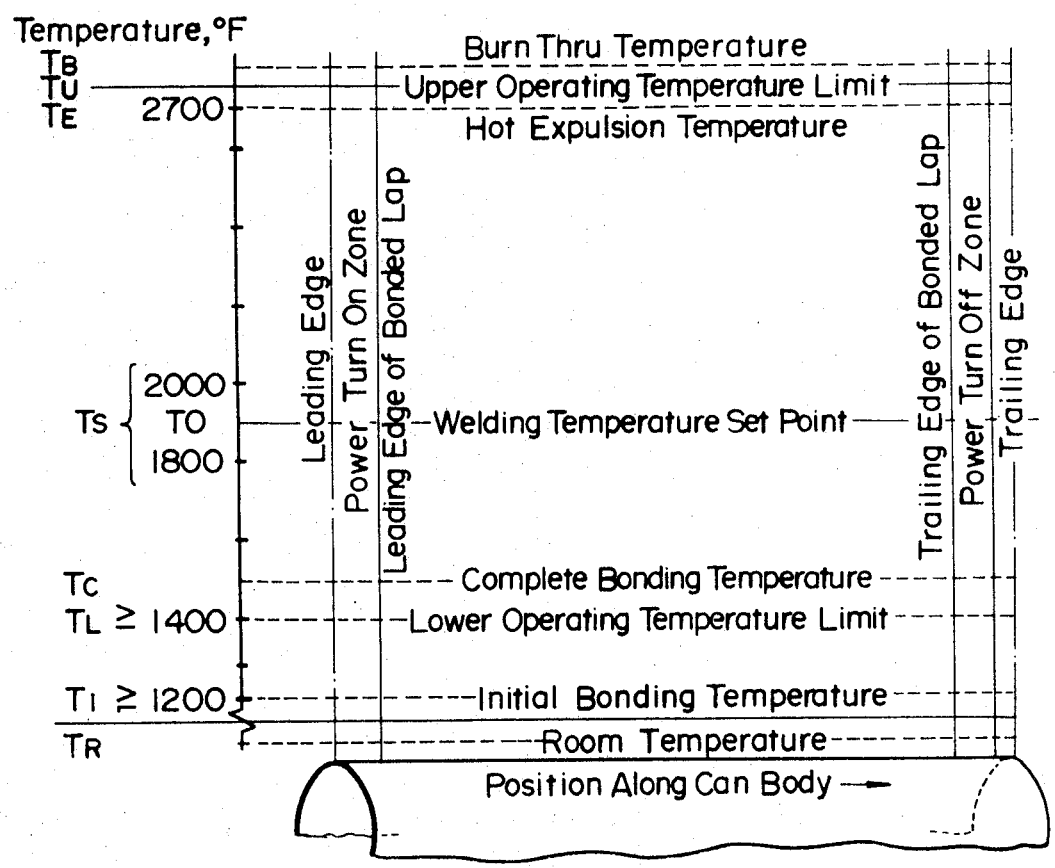
FIGURE 19 is a diagram showing can body geometry and temperature limits.

Referring to the upper limits of the diagram of FIGURE 19, it will be seen that burn through occurs at a temperature on the order of 2800 degrees F. Therefore, the upper operating temperature limit under any circumstances should not exceed 2750 degrees F. However, undesired expulsion of metal occurs at a temperature on the order of 2700 degrees F. Therefore, as indicated above, a preferred maximum welding temperature is on the order of 2500 degrees F. Furthermore, as indicated above, in order to assure complete bonding and at the same time to eliminate metal expulsion, the preferred temperature range is from 1800 degrees F. to 2000 degrees F., thereby providing ample localized tolerances which will assure a complete bonding at the end of the range and the absence of metal expulsion at the upper end of the range.

It will be apparent from the foregoing that while the term "welding temperature" is utilized here, there is no fusing of the metal. The metal of the laps of the body blank is heated due to the resistance to electrical energy flow through the laps to a temperature at which bonding occurs under pressure. In other words, the weld formed in accordance with this invention is not a fusion weld, but one of combined temperature and pressure.

It is to be noted that in the diagram of FIGURE 19 POWER TURN ON AND OFF zones are indicated at the opposite ends of the can body. It is to be understood that in accordance with this invention, it is unnecessary that the power be completely turned off to assure that the welded seam does not extend to the opposite ends of the can body. The term "termination" as utilized in the above description is to be understood to mean termination of the welding of the seam through current reduction as well as current termination.

At this time it is pointed out that although the samples illustrated in the photomicrographs of FIGURES 11 through 17 were made from low carbon steel which has been double reduced or double rolled to have a thickness of 0.006 inch, the metal which may be utilized in accordance with this invention is not so limited to this thickness although it is a preferred thickness for commercial use at this time. Experiments have indicated that the welded seam may be utilized in conjunction with metal as thin as 0.002 inch and while a practical upper limit for can body manufacture is 0.011 inch, thicker metal may be welded in this same manner.

It is also pointed out here that although the over-all coating applied to the metal from which the body blank is formed is immaterial, from a practical standpoint, it should be a coating which can be easily and completely removed so that the edge portions to be welded together may be free of any coating material. It has been found that the existence of conventional coating materials along the edge portions to be welded together is seriously detrimental to the formation of a commercially acceptable weld.

At this time it is pointed out that with some materials the flangeability of a welded seam can body may be enhanced by either pre-annealing the body blanks or post-annealing the can bodies, or by choosing a material of better elongation.

Although only several preferred embodiments of the invention have been specifically illustrated and described herein, it is to be understood that other modifications may be made in the welded seam construction without departing from the spirit of the invention.

What is claimed as new:

1. In a can body of the type formed from a metal sheet having two edge portions connected together by a continuous seam weld to define a welded body seam, and wherein said can body is adapted to have the ends thereof closed by ends secured thereto by a folded seam; the improvement comprising the termination of said welded body seam adjacent to but short of the end edges of said can body and thereby automatically controlling the termiflange to be formed on said can body whereby said can body may be readily conventionally flanged without the end edge thereof cracking at said welded body seam.

2. The can body of claim 1 wherein said welded together edge portions are secured together in lapped relation by tack welds spaced therealong and a seam weld over and between all tack welds with there being a tack weld at each end of said welded body seam and accurately defining the terminal ends of said welded body seam.

3. The can body of claim 1 wherein said welded body seam is a lap seam and wherein at each end of said can body at least one of said lapped edge portions has its corners removed along lines oblique to the respective free edge thereof to restrict the lapping of said edge portions and thereby automatically controlling the termination of said welded body seam short of the end edges of said can body.

4. The can body of claim 1 wherein said welded body seam is a lap seam and wherein at each end of said can body each of said lapped edge portions is cut in crossing relation to terminate the lapping of said lapped edge portions a predetermined distance from each end of said can body and thereby automatically controlling the termination of said welded body seam short of the end edges of said can body.

5. The can body of claim 1 wherein the spacing of a terminal end of the welded seam from an adjacent end edge of said can body is of the order of 0.010 inch to 0.100 inch.

6. The can body of claim 1 wherein the spacing of a terminal end of the welded seam from an adjacent end edge of said can body is proportional to the diameter thereof and is on the order of 0.025 inch to 0.035 inch for a can body having a diameter on the order of 2 to 3 inches.

7. The can body of claim 1 wherein the thickness of said can body along said welded body seam is approximately 1.5 to 1.8 times the thickness of said sheet and the thickness of said can body immediately adjacent said welded body seam is greater than the nominal thickness of said sheet.

8. The can body of claim 1 wherein said sheet is a cold rolled ferrous metal having a rolling grain, and said rolling grain extends circumferentially of said can body.

9. The can body of claim 1 wherein said welded body seam shows evidence of prior tack welding with there being a tack weld adjacent to but spaced from each end of said welded body seam.

10. The can body of claim 1 wherein said can body is formed of a low carbon steel and the grain structure of said welded body seam is of a nature resulting from the heating of the metal at the weld interface to a temperature in excess of 1200 degrees F. and below the melting temperature of the metal.

11. The can body of claim 1 wherein said can body is formed of a low carbon steel and the grain structure of said welded body seam is of a nature resulting from the heating of the metal at the weld interface to a temperature ranging between 1800 degrees F. and 2000 degrees F.

12. The can body of claim 1 wherein said can body is formed of a low carbon steel and the grain structure of said welded body seam is of a nature resulting from the heating of the metal at the weld interface to a temperature ranging between 1800 degrees F. and 2000 degrees F. with there having been grain growth across the weld interface under external pressure.

13. The can body of claim 1 wherein said welded body seam shows evidence of prior tack welding with there being evidence of said tack welds having been annealed and the metal thereof softened by the reheating thereof during the seam welding of said body seam.

14. The can body of claim 1 wherein said welded together edge portions are secured together in lapped relation by tack welds spaced therealong and a seam weld over and between all tack welds with there being a tack weld at one end of said welded body seam and accurately defining one terminal end of said welded body seam, the other end of said welded body seam terminating intermediate an adjacent end of said can body and an adjacent tack weld.

15. A method of forming a welded side seam in a metal can body comprising the steps of overlapping edge portions of a body blank subsequent to the shaping thereof into tubular form and thereafter tack welding the overlapped edge portions at spaced intervals to form a tack welded seam portion with the terminal ones of said tack welds being spaced from their respective ends of the can body, starting the movement of said tack welded seam portion between a pair of opposed electrodes and then directing electrical energy through the electrodes in timed relation to the movement of said tack welded seam between the electrodes, forming a continuous seam weld along said tack welded seam to a predetermined point adjacent the other end of the can body and then terminating the flow of electrical energy to terminate the seam weld short of the can body other end by a distance less than the width of the seaming flange to be formed on said can body, and then moving the can body out from between the electrodes.

16. The method of claim 15 including the step of terminating the seam welding in a terminal one of the tack welds.

17. The method of claim 15 including the steps of both starting and terminating the seam welding in terminal ones of the tack welds.

18. The method of claim 15 including the step of cutting the overlapped edge portions of the body blank at corners and obliquely to the edges thereof prior to the shaping and tack welding and employing said cut edges to control the initiation and termination of the seam welding.

19. The method of claim 15 including the step of applying both heat and pressure to said overlapping edge portions, the heat being provided by resistance electrical heating said edge portions to a temperature below the melting temperature of the metal wherein bonding occurs by grain growth across an interface between said overlapping edge portions.

References Cited
UNITED STATES PATENTS

| | | | | |
|---|---|---|---|---|
| 1,511,849 | 10/1924 | Taylor | | 219—67 |
| 1,642,174 | 9/1927 | Rudolph | | 220—75 |
| 1,847,310 | 3/1932 | Schmitz | | 219—67 |
| 2,124,004 | 7/1938 | O'Neil | | 220—75 |
| 2,163,619 | 6/1939 | Murch | | 220—75 |
| 2,204,549 | 6/1940 | Murch | | 219—64 |

JOSEPH R. LECLAIR, Primary Examiner

J. R. GARRETT, Assistant Examiner

U.S. Cl. X.R.

113—120; 219—64

PO-1050
(5/69)

UNITED STATES PATENT OFFICE
CERTIFICATE OF CORRECTION

Patent No. 3,468,453      Dated September 23, 1969

Inventor(s) PAUL M. ERLANDSON

It is certified that error appears in the above-identified patent and that said Letters Patent are hereby corrected as shown below:

Column 9, line 29, cancel "and thereby automatically controlling the termi-" and insert the following: -- by a distance less than the width of the seaming --

SIGNED AND
SEALED

DEC 23 1969

(SEAL)
Attest:

Edward M. Fletcher, Jr.
Attesting Officer

WILLIAM E. SCHUYLER,
Commissioner of Paten